(12) United States Patent
Inoue et al.

(10) Patent No.: US 8,532,404 B2
(45) Date of Patent: Sep. 10, 2013

(54) IMAGE PROCESSING APPARATUS, IMAGE PROCESSING METHOD AND COMPUTER-READABLE MEDIUM

(75) Inventors: Nobuo Inoue, Tokyo (JP); Minoru Sodeura, Ebina (JP); Toshiyuki Yamada, Ebina (JP); Shintaro Adachi, Ebina (JP); Tsutomu Kimura, Minamiashigara (JP)

(73) Assignee: Fuji Xerox Co., Ltd., Tokyo (JP)

(*) Notice: Subject to any disclaimer, the term of this patent is extended or adjusted under 35 U.S.C. 154(b) by 1016 days.

(21) Appl. No.: 12/568,723

(22) Filed: Sep. 29, 2009

(65) Prior Publication Data

US 2010/0246945 A1   Sep. 30, 2010

(30) Foreign Application Priority Data

Mar. 27, 2009   (JP) ................... 2009-078040

(51) Int. Cl.
*G06K 9/36* (2006.01)
*G06K 9/46* (2006.01)

(52) U.S. Cl.
USPC .......................................... 382/232; 382/165

(58) Field of Classification Search
USPC ................. 382/162, 164, 165, 166, 168, 170, 382/172, 176, 190, 195, 232, 234, 244
See application file for complete search history.

(56) References Cited

U.S. PATENT DOCUMENTS

| | | | | |
|---|---|---|---|---|
| 5,696,842 A | * | 12/1997 | Shirasawa et al. | 382/176 |
| 5,852,742 A | * | 12/1998 | Vondran et al. | 712/28 |
| 6,735,341 B1 | * | 5/2004 | Horie et al. | 382/239 |
| 6,744,918 B1 | * | 6/2004 | Caldato et al. | 382/164 |
| 7,171,618 B2 | * | 1/2007 | Harrington et al. | 715/229 |

FOREIGN PATENT DOCUMENTS

JP   2003-244447 A   8/2003

* cited by examiner

*Primary Examiner* — Phuoc Tran
(74) *Attorney, Agent, or Firm* — Sughrue Mion, PLLC

(57) ABSTRACT

An image processing apparatus includes a plurality of compression units and a switching unit. The plurality of compression units compress image information by different compression methods. The switching unit extracts plural pieces of color information from pieces of color information which constitute the image information in a color space expressing the image information, and selects one of the plurality of compression units in accordance with hue angles of the plural pieces of extracted color information.

9 Claims, 13 Drawing Sheets

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 USC 119 from Japanese Patent Application No. 2009-78040 filed on Mar. 27, 2009.

BACKGROUND

Technical Field

The present invention relates to an image processing apparatus, an image processing method and a computer-readable medium storing a program that causes a computer to execute image processing.

SUMMARY

According to an aspect of the invention, an image processing apparatus includes a plurality of compression units and a switching unit. The plurality of compression units compress image information by different compression methods. The switching unit extracts plural pieces of color information from pieces of color information which constitute the image information in a color space expressing the image information, and selects one of the plurality of compression units in accordance with hue angles of the plural pieces of extracted color information.

BRIEF DESCRIPTION OF THE DRAWINGS

Exemplary embodiments of the invention will be described in detail below based on the accompanying drawings, wherein.

DETAILED DESCRIPTION

Hereinafter, description will be given on exemplary embodiments of the present invention. Specifically, description will be given in the following order.

1. Entire Configuration of Image Processing Apparatus
2. First Configuration Example of Compression Switching Section
3. Second Configuration Example of Compression Switching Section
4. Third Configuration Example of Compression Switching Section
5. Image Processing Program <1. Entire Configuration of Image Processing Apparatus>

Figure 1:
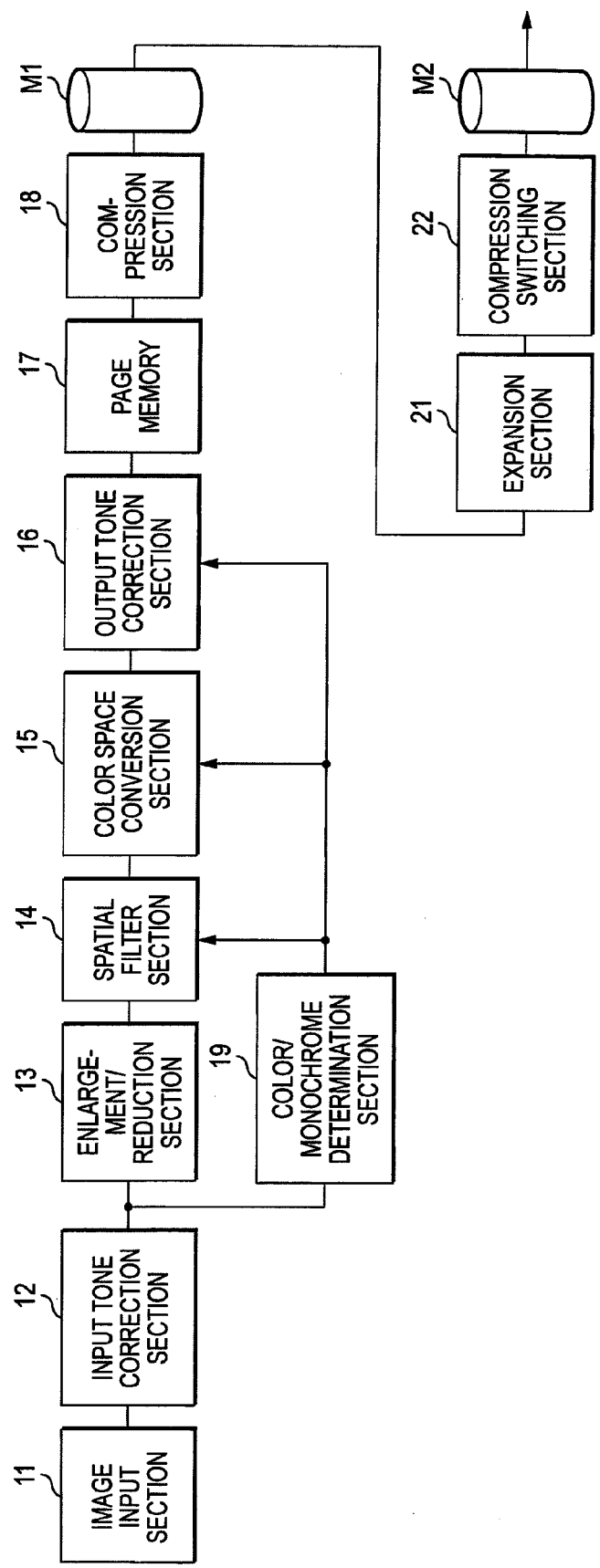
FIG. 1 is a block diagram showing the entire configuration of an image processing apparatus according to an exemplary embodiment of the invention.

FIG. 1 is a block diagram showing the entire configuration of an image processing apparatus according to this exemplary embodiment. Also, this exemplary embodiment will be described with a digital multi-function device being taken as an example of the image processing apparatus. However, an object for which this exemplary embodiment can apply is not limited thereto. For example, this exemplary embodiment is also applicable to other apparatuses such as photographing by means of a digital camera (for example, white-board mode).

The image processing apparatus of this exemplary embodiment includes an image input section 11, an input tone correction section 12, an enlargement/reduction section 13, a spatial filter section 14, a color space conversion section 15, an output tone correction section 16, a page memory 17, a compression section 18, a first memory section M1, a color/monochrome determination section 19, an expansion section 21, a compression switching section 22, and a second memory section M2.

The image input section 11 acquires electronic data of images which are objects to be processed. For example, the image input section 11 is a scanner that acquires electronic data of images from original documents, or a device that acquires electronic data transmitted from an external computer via a network.

The input tone correction section 12 corrects tone in the electronic data of the images acquired by the image input section 11, and corrects the tone, for example, using a predetermined tone curve.

The enlargement/reduction section 13 performs a process of enlarging or reducing the electronic data of the images in accordance with an enlargement ratio or a reduction ratio. The spatial filter section 14 filters the electronic data of the images using a spatial filter. For example, the spatial filter section 14 applies the spatial filter to the electronic data of the images to perform a process (for example, a noise reduction process, a smoothening process, and an enhancement process) such as MTF (Modulation Transfer Function) correction in accordance with the characteristics of the spatial filter.

The color space conversion section 15 converts a color space expressing the electronic data (pixel values) of the image. For example, the color space conversion section 15 converts image data in the RGB color space into image data in the YCbCr color space. The output tone correction section 16 corrects tone in accordance with the characteristics of an output device. The page memory 17 temporarily stores electronic data of images in units of pages.

The compression section 18 compresses electronic data of images in a certain compression method (for example, JPEG (Joint Photographic Experts Group)). The first memory section M1 stores the compressed image data. Examples of the first memory section M1 include a hard-disk drive (HDD).

The color/monochrome determination section 19 determines, based on the electronic data of the image acquired by the image input section 11, as to whether the images are color images or monochrome (single color) images. The determination result is reflected onto the spatial filter section 14, the color space conversion section 15 and the output tone correction section 16.

The expansion section 21 carries out a process for expanding the compressed image data stored in the first memory section M1. The compression switching section 22 carries out a process for reducing colors to specific colors for the electronic data of the images expanded by the expansion section 21. The compression switching section 22 is one of characteristic portions of the image processing apparatus according to this exemplary embodiment. Details of the compression switching section 22 will be described later.

The second memory section M2 stores image data in a certain data format. Examples of the second memory section M2 include a hard-disk drive (HDD). The same storage may be shared by the second memory section M2 and the first memory section M1. The color-reduced image data stored in the second memory section M2 is transmitted to an outside of the image processing apparatus via the network.

<2. First Configuration Example of Compression Switching Section>

[Configuration Example of Compression Switching Section]

Figure 2:
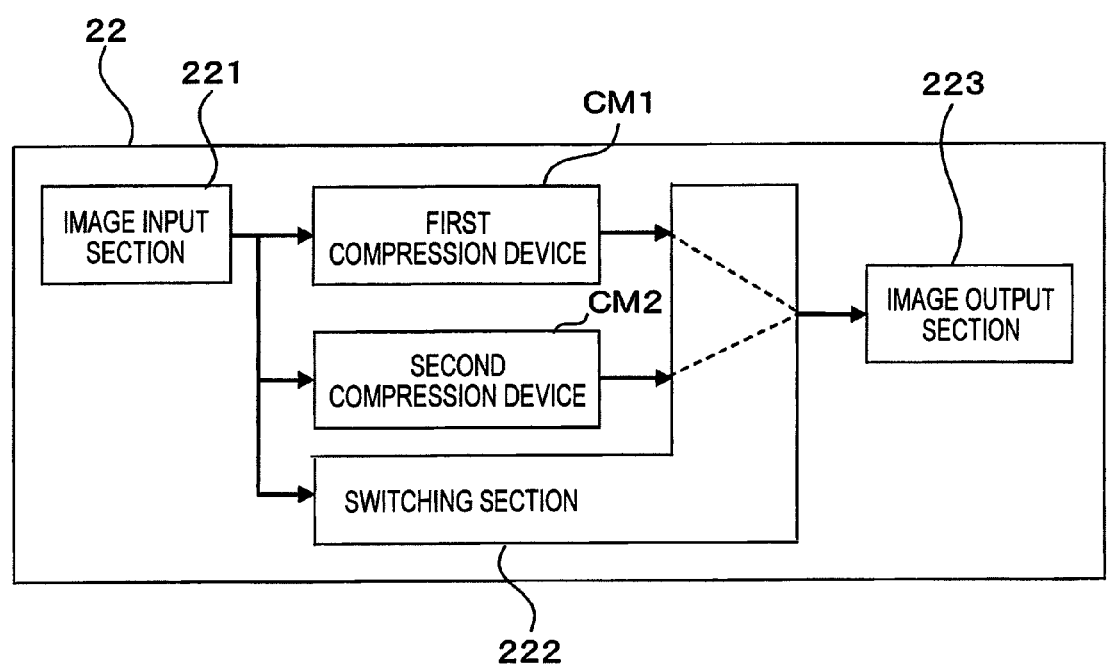
FIG. 2 is a block diagram showing a first configuration example of a compression switching section.

FIG. 2 is a block diagram showing a first configuration example of the compression switching section. The compression switching section 22 includes an image input section 221, a first compression device CM1, a second compression device CM2, a switching section 222, and an image output section 223. This exemplary embodiment will be described based on an example in which two compression devices of the first compression device CM1 and the second compression device CM2 are provided. However, this exemplary embodiment may be provided with three or more compression devices.

Expanded image data are input from the expansion section 21 shown in FIG. 1 to the image input section 221. Plural compression devices, which include the first compression device CM1 and the second compression device CM2, carry out compression by compression methods different from each other. In this exemplary embodiment, it is assumed that the first compression device CM1 carries out compression by a lossy compression method, and that the second compression device CM2 carries out compression by a lossless compression method. Examples of the lossy compression method include JPEG, and, examples of the lossless compression method include MMR and JBIG2. The compression methods are not limited to JPEG, MMR or JBIG2 which are listed above; but other compression methods are available.

The switching section 222 switches among the plural compression devices including the first compression device CM1 and the second compression device CM2. That is, the switching section 222 extracts plural pieces of color information from pieces of color information which constitute the image data, input from the image input section 221, in a color space expressing the input image data. The switching section 222 selects one of the plural compression units in accordance with hue angles of the plural pieces of extracted color information. Based on this selection, the switching section 222 selects either one of image data compressed by the first compression device CM1 or image data compressed by the second compression device CM2, and outputs the selected image data to the image output section 223. Details of the switching section 22 will be described later.

The image output section 223 changes the image data, which are compressed, by either one of the plural compression devices including the first compression device CM1 and the second compression device CM2, into the certain data format and outputs it.

With this image processing apparatus, the compression method is switched in accordance with the hues in the image data. Therefore, the compression method may be switched without elements (characters and photographs) of the image data being discriminated and separated. If it is attempted to discriminate elements of image data, it cannot be said that the discrimination result is always correct. For this reason, if an area in interest which is a character area (high-frequency portion) is compressed in the format of JPEG, an image quality will deteriorate due to mosquito noise. In this exemplary embodiment, the compression method is switched in accordance with hue angles of representative colors, compressed image data which are smooth and free from pseudo profile can be achieved.

[Configuration of Switching Section]

Figure 3:
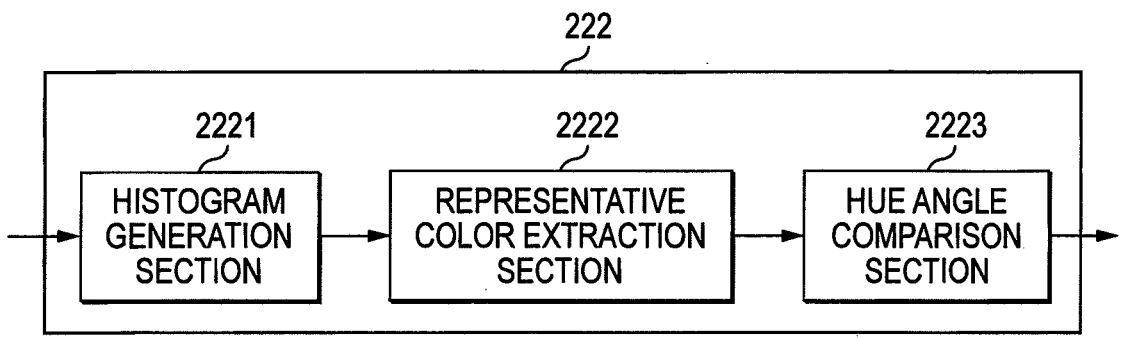
FIG. 3 is a block diagram showing a configuration example of the switching section.

FIG. 3 is a block diagram showing a configuration example of the switching section 222. The switching section 222 includes a histogram generation section 2221, a representative color extraction section 2222, and a hue angle comparison section 2223.

Figure 4:
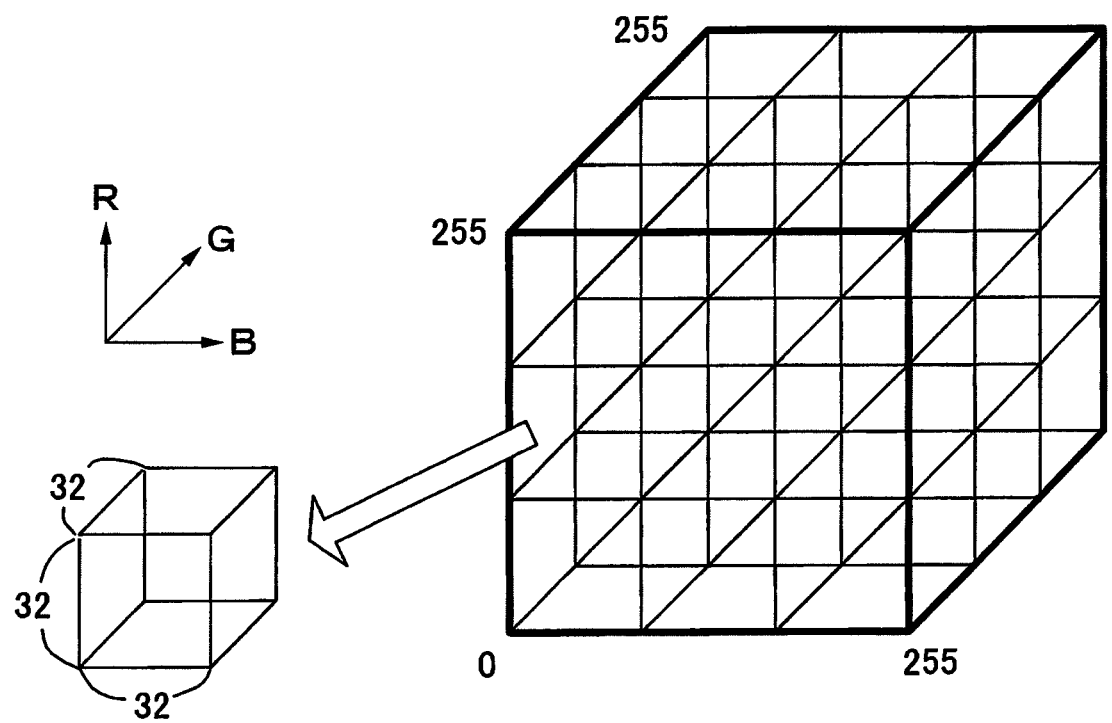
FIG. 4 is a schematic view showing area segmentation of a color space.

The histogram generation section 2221 performs a process of counting frequencies of appearance (histogram) of pixel values, for the input image data. The counting of the frequencies of appearance of pixel values by the histogram generation section 2221 will be described below. FIG. 4 is a schematic view showing area segmentation of a color space. The histogram generation section 2221 divides a three-dimensional color space in the image data into predetermined segment areas when generating a histogram based on the image data, and then counts the frequency of each of the segment areas.

As shown in FIG. 4, for example, where tone values in the RGB color space can take any of 0 through 255, the tone values of RGB are equally divided into eight at 32-tone-value intervals. Therefore, the RGB color space is divided into 8×8×8=512 segment areas. The histogram generation section 2221 counts the frequency of each of the 512 segment areas. It is noted that the division unit (that is, 32 tone values) is just an example, and another division unit may be appropriately set.

The representative color extraction section 2222 shown in FIG. 3 performs a process of extracting specific colors (the representative color) from peaks of the histograms generated by the histogram generation section 2221. Specifically, the representative color extraction section 2222 extracts only histograms exceeding a predetermined frequency from among the histograms for the segment areas generated by the histogram generation section 2221. Then, the representative color extraction section 2222 excludes colors having saturations lower than a preset saturation, from peaks of the extracted histograms. Next, the remaining peak colors are extracted as the representative colors.

The hue angle comparison section 2223 compares angles formed between hue angles of the representative colors extracted by the representative color extraction section 2222, with a threshold value. That is, with respect to all combinations obtained by any two of the extracted representative colors, an angle formed between hue angles of the two representative colors is compared with a threshold value. The hue angle comparison section 2223 outputs an instruction to select either one of the plural compression devices including the first compression device CM1 and the second compression device CM2 in accordance with the result of the comparison of the angles formed between the hue angles.

[Comparison Example of Hue Angles]

Figure 5:
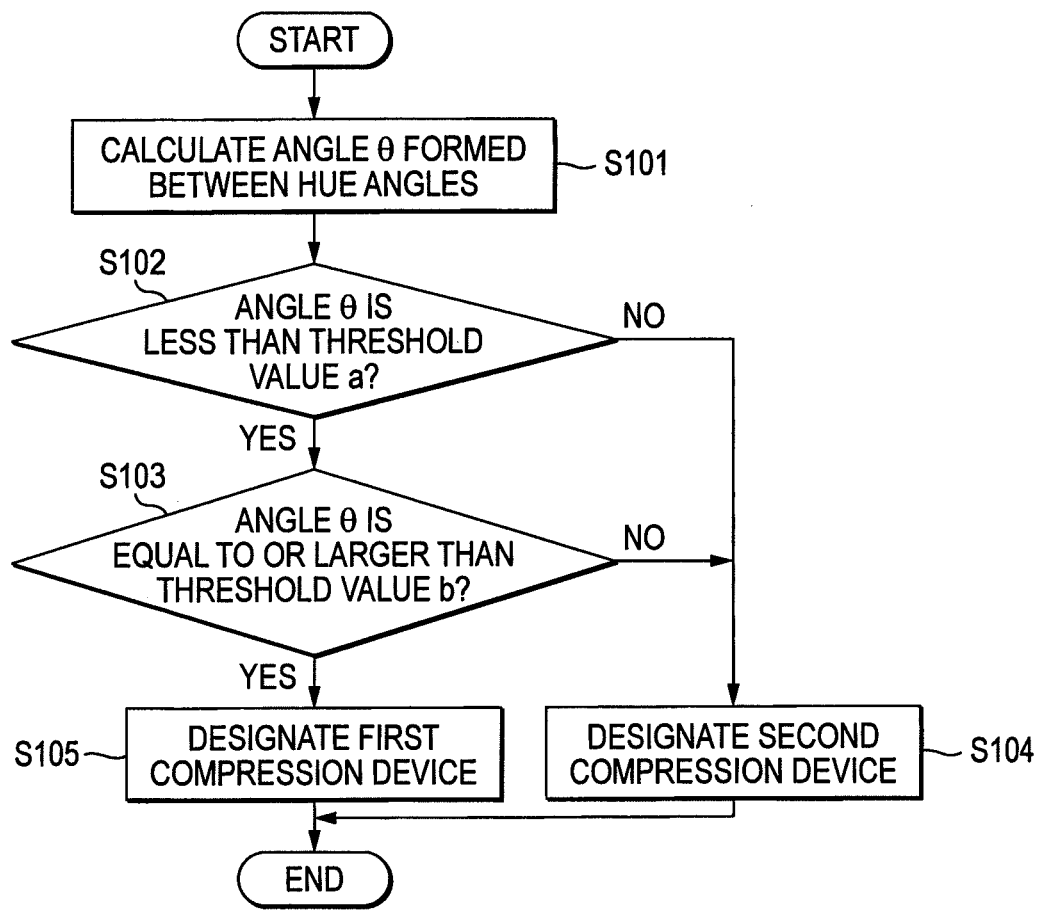
FIG. 5 is a flowchart for explaining a flow of a process carried out by a hue angle comparison section.

FIG. 5 is a flowchart for explaining a flow of a process carried out by the hue angle comparison section 2223. First, the hue angle comparison section 2223 (see FIG. 3) selects two representative colors from the representative colors extracted by the representative color extraction section 2222 (see FIG. 3), and calculates an angle θ formed between the selected hue angles (step S101).

Figure 6:
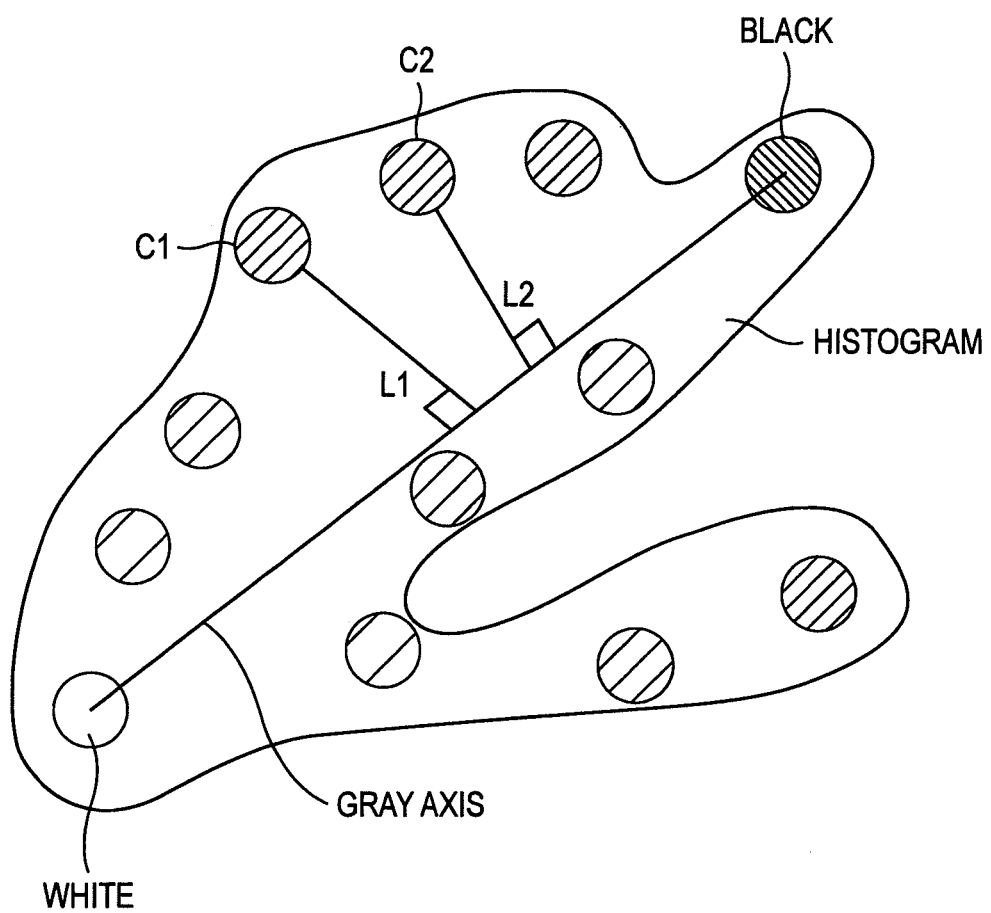
FIG. 6 is a schematic view showing how to obtain an angle θ formed by hue angles.

The angle θ formed between the hue angles is obtained as follows. FIG. 6 is a schematic view showing how to obtain the angle θ formed between the hue angles. Circles shown in FIG. 6 indicate the representative colors extracted from a histogram of pixel values in a certain color space. A line connecting white to black of these representative colors serves as a gray axis (achromatic color axis), and the gray axis is established.

Next, a perpendicular line is drawn from the positions of the respective representative colors in this color space to the gray axis. For example, L1 and L2 indicate perpendicular lines drawn to the gray axis from the two representative colors C1 and C2, respectively. An angle formed between these perpendicular lines L1 and L2 is the angle θ formed between the hue angles.

The angle formed between the perpendicular lines L1 and L2 is determined by utilizing the inner product of the perpendicular lines L1 and L2. For example, where it is assumed that, in the RGB color space, the coordinates of the representative color C1 are (r1, g1, b1), the coordinates of the representative color C2 are (r2, g2, b2), a distance of the perpendicular line L1 is |L1|, a distance of the perpendicular line L2 is |L2|, and the angle formed between the hue angles is θ, the inner product of the perpendicular lines L1 and L2 can be expressed as follows;

$$(L1, L2) = r1 \cdot r2 + g1 \cdot g2 + b1 \cdot b2 = |L1| \cdot |L2| \cdot \cos \theta$$

Therefore, it becomes possible to obtain the angle θ formed between the perpendicular lines L1 and L2 based on the distances |L1|, |L2| of the perpendicular lines L1 and L2, the coordinates of the representative colors C1 and C2 and the inner product relation described above.

Next, returning to the flowchart of FIG. 5, the obtained angle θ formed between the hue angles is compared with two preset threshold values "a" and "b" (a>b) (step S102 and step S103).

First, it is determined as to whether the angle θ formed between the hue angles is less than the threshold value "a" (step S102). If the angle θ formed between the hue angles is not less than the threshold value "a," an instruction to select the second compression device CM2 (lossless compression) is given (step S104).

On the other hand, if the angle θ formed between the hue angles is less than the threshold value "a," the angle θ is compared with the threshold value "b" (step S103). Unless the angle θ is equal to or more than the threshold value "b," an instruction to select the second compression device CM2 is given (Step S104). If the angle θ is equal to or more than the threshold value "b," an instruction to select the first compression device CM1 (lossy compression) is given (step S105).

[Example of Setting Threshold Values]

Next, description will be given on an example of setting the threshold values "a" and "b." The threshold values "a" and "b" are used to determine an appearance distance between two representative colors. For example, the threshold values "a" and "b" may be determined based on an experimental result. In one specific example, the threshold value "a" is 17.5 degrees, and the threshold value "b" is 10 degrees.

The hue angle comparison section 2223 first compares the angle θ formed between the hue angles of the two representative colors with the threshold value "a" (17.5 degrees). Where the formed angle θ is not less than the threshold value "a" (17.5 degrees), the two representative colors are far from each other on appearance (that is, not similar colors). Then, the second compression device CM2 of the lossless compression method is selected for compression.

On the other hand, where the formed angle θ is less than the threshold value "a" (17.5 degrees), the hue angle comparison section 2223 compares the formed angle θ with the threshold value "b" (10 degrees). Unless the formed angle θ is equal to or more than the threshold value "b" (10 degrees), the two representative colors are the same colors on appearance. Then, the second compression device CM2 of the lossless compression method is selected for compression.

If the formed angle θ is less than the threshold value "a" (17.5 degrees) and equal to or more than the threshold value "b" (10 degrees), the two representative colors form gradation on appearance. Then, the first compression device CM1 of the lossy compression method is selected for compression.

That is, where the second compression device CM2 is selected for compression, there is a high possibility that the image data are of single color or multiple color characters, etc. On the other hand, where the first compression device CM1 is selected for compression, there is a high possibility that the image data are of photographs etc., and are formed with multiple colors and include gradation. Thus, the characteristics of the image data are determined based on the angle θ formed between the hue angles, and a compression method is selected in accordance with the characteristics.

Figure 7:
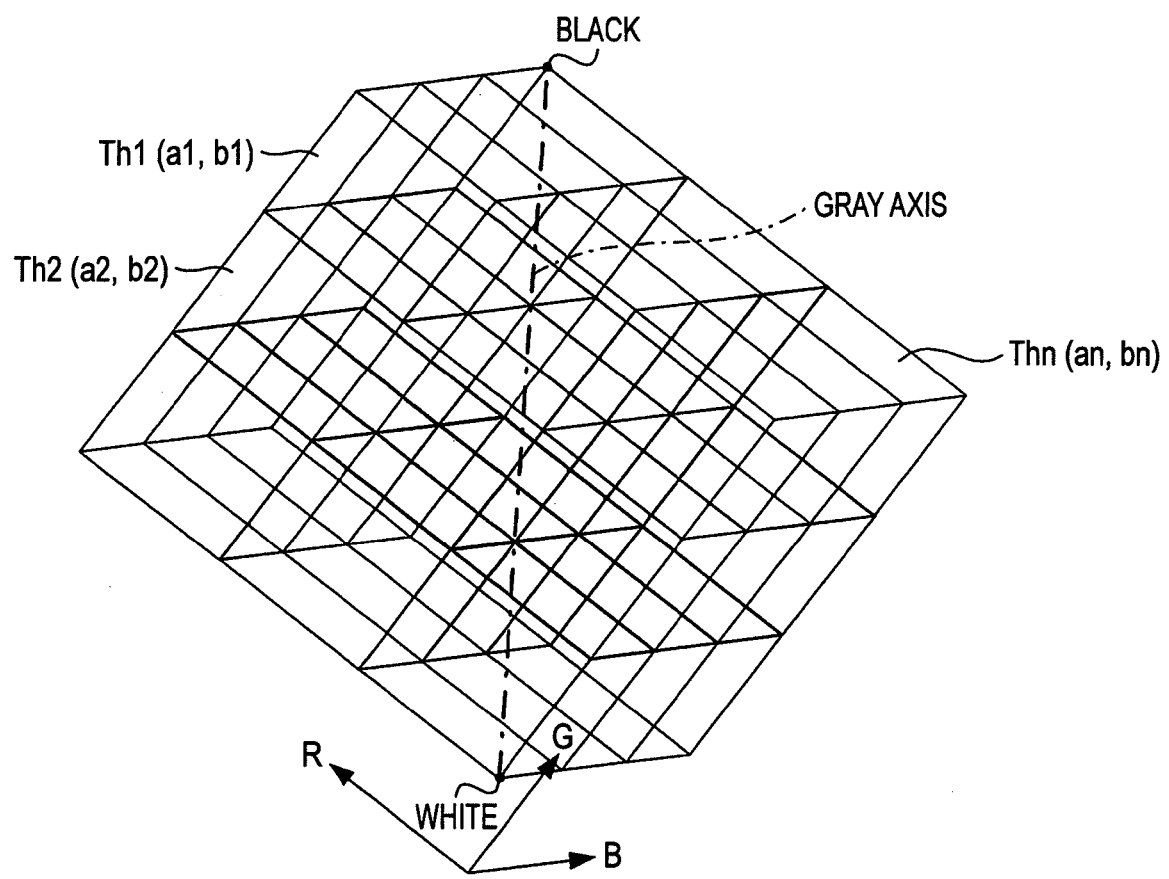
FIG. 7 is a schematic view for explaining setting of threshold values in an RGB color space which is an example of a color space.

The threshold values "a" and "b" may be fixed or variable. If the threshold values "a" and "b" are made variable, the threshold values "a" and "b" may be set in accordance with color gamuts, in the color space, of the representative colors for which the angle θ is to be obtained. FIG. 7 is a schematic view showing setting of threshold values in the RGB color space which is an example of the color space. First, the RGB color space is divided into plural segment areas (for example, "n" segment areas). Then, the threshold values "a" and "b" are set for each of the segment areas. For example, a combination of the threshold values "a" and "b" for a first segment area is Th1(a1, b1), a combination of the threshold values "a" and "b" for a second segment area is Th2(a2, b2), . . . , and a combination of the threshold values "a" and "b" for an n-th segment area is Thn(an, bn), are set, and these combinations are stored in a memory.

The hue angle comparison section 2223 reads, from the memory, a combination Th of the threshold values "a" and "b" corresponding to a segment area to which two representative colors for which the angle θ formed between the hue angles is to be calculated belong. If the two representative colors belong to different segment areas, the hue angle comparison section 2223 reads combinations of the threshold values for the respective segment areas, and uses values obtained by averaging the respective threshold values "a" and "b", as the threshold values "a" and "b."

[Units of Selection of Compression Method]

The compression switching section 222 of the first configuration example selects the first compression device CM1 or the second compression device CM2 for each page of image data. That is, the compression switching section 222 generates a histogram for one page of image data and extracts representative colors, selects combinations of two representative colors from the representative colors extracted for one page, obtains an angle θ formed between hue angles of each selected combination, and selects the first compression device CM1 or the second compression device CM2 by the comparison using the threshold values "a" and "b."

An instruction to select the first compression device CM1 or the second compression device CM2 is given for each of the combinations of two representative colors for which the angle θ formed between the hue angles is to be obtained. With regard to which a compression device is finally used for image data of one page, the following determination examples are conceivable.

(1) If there is at least an instruction to select the first compression device CM1 among the instructions to select compression devices, which are generated for the respective combinations of two representative colors for one page, the image compressed by the first compression device CM1 is selected for the entire image data for one page.

(2) If there is at least an instruction to select the second compression device CM2 among the instructions to select compression devices, which are generated for the combinations of two representative colors for one page, the image compressed by the second compression device CM2 is selected for the entire image data of one page.

(3) With regard to the instructions to select a compression device which are generated for the respective combinations of two representative colors in one page, a compression device corresponding to one of (i) the instructions to select the first compression device CM1 and (ii) the instructions to select the second compression device CM2, which is larger in number than the other, is selected. The image compressed by such a compression device is selected for the entire image data of one page.

Which one of the determination examples described above is to be used depends on the settings of the image processing apparatus or on the settings made by a user. For example, a setting may be made so that (1) is chosen when priority is placed on image quality, (2) is chosen when priority placed on the compression ratio, and (3) is chosen when priority is placed on dynamic switching.

<3. Second Configuration Example of Compression Switching Section>
[Configuration Example of Compression Switching Section]

Figure 8:
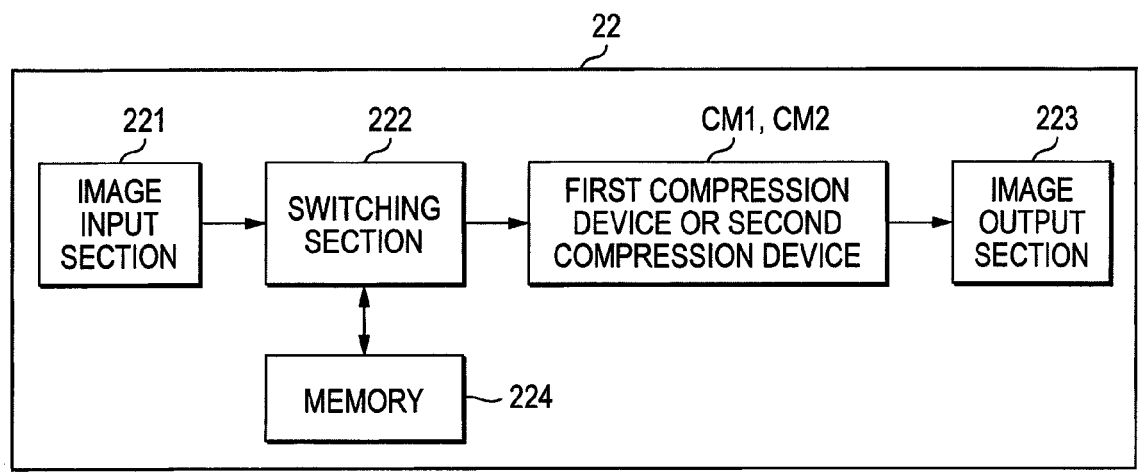
FIG. 8 is a block diagram showing a second configuration example of the compression switching section.

FIG. 8 is a block diagram showing a second configuration example of the compression switching section. The compression switching section 22 includes an image input section 221, a switching section 222, a memory 224, a first compression device CM1, a second compression device CM2, and an image output section 223. This exemplary embodiment will be described based on an example in which two compression devices of the first compression device CM1 and the second compression device CM2 are provided. However, this exemplary embodiment may be provided with three or more compression devices.

Expanded image data are input from the expansion section 21 shown in FIG. 1 to the image input section 221. Plural compression devices, which include the first compression device CM1 and the second compression device CM2, carry out compression by compression methods different from each other. In this exemplary embodiment, it is assumed that the first compression device CM1 carries out compression by a lossy compression method and that the second compression device CM2 carries out compression by a lossless compression method. Examples of the lossy compression method include JPEG, and, examples of the lossless compression method include MMR and JBIG2. The compression methods are not limited to JPEG, MMR or JBIG2 which are listed above, but other compression methods are available.

The switching section 222 switches among the plural compression devices including the first compression device CM1 and the second compression device CM2. That is, the switching section 222 temporarily stores image data input by the image input section 221 in the memory 224. Then, the switching section 222 extracts plural pieces of color information from pieces of color information which constitute the image data read out from the memory 24 in a color space expressing the image data. The switching section 222 selects one of the plural compression devices in accordance with hue angles of the plural pieces of extracted color information.

The switching section 222 inputs the image data to the compression device selected from the plural compression devices, which include the first compression device CM1 and the second compression device CM2. The configuration of the switching section 222, an example in which the switching section 222 compares an angle formed between hue angles, examples of setting threshold values and units of selection of the compression method are the same as those in the compression switching section of the first configuration example described above.

The plural compression devices including the first compression device CM1 and the second compression device CM2 carry out compression by the compression methods different from each other. In this exemplary embodiment, it is assumed that the first compression device CM1 carries out compression by a lossy compression method and that the second compression device CM2 carries out compression by a lossless compression method. Examples of the lossy compression method include JPEG, and, examples of the lossless compression method include MMR and JBIG2. The compression methods are not limited to JPEG, MMR or JBIG2 which are listed above, but other compression methods are available.

The image output section 223 changes the image data, which are compressed by either one of the plural compression devices including the first compression device CM1 and the second compression device CM2, into the certain data format, and outputs it.

In the second configuration example of the compression switching section 22, before transmitting image data to a compression device, one of the plural compression devices including the first compression device CM1 and the second compression device CM2 is selected. Then, the image data are input only to the selected compression device.

<4. Third Configuration Example of Compression Switching Section>
[Configuration Example of Compression Switching Section]

Figure 9:
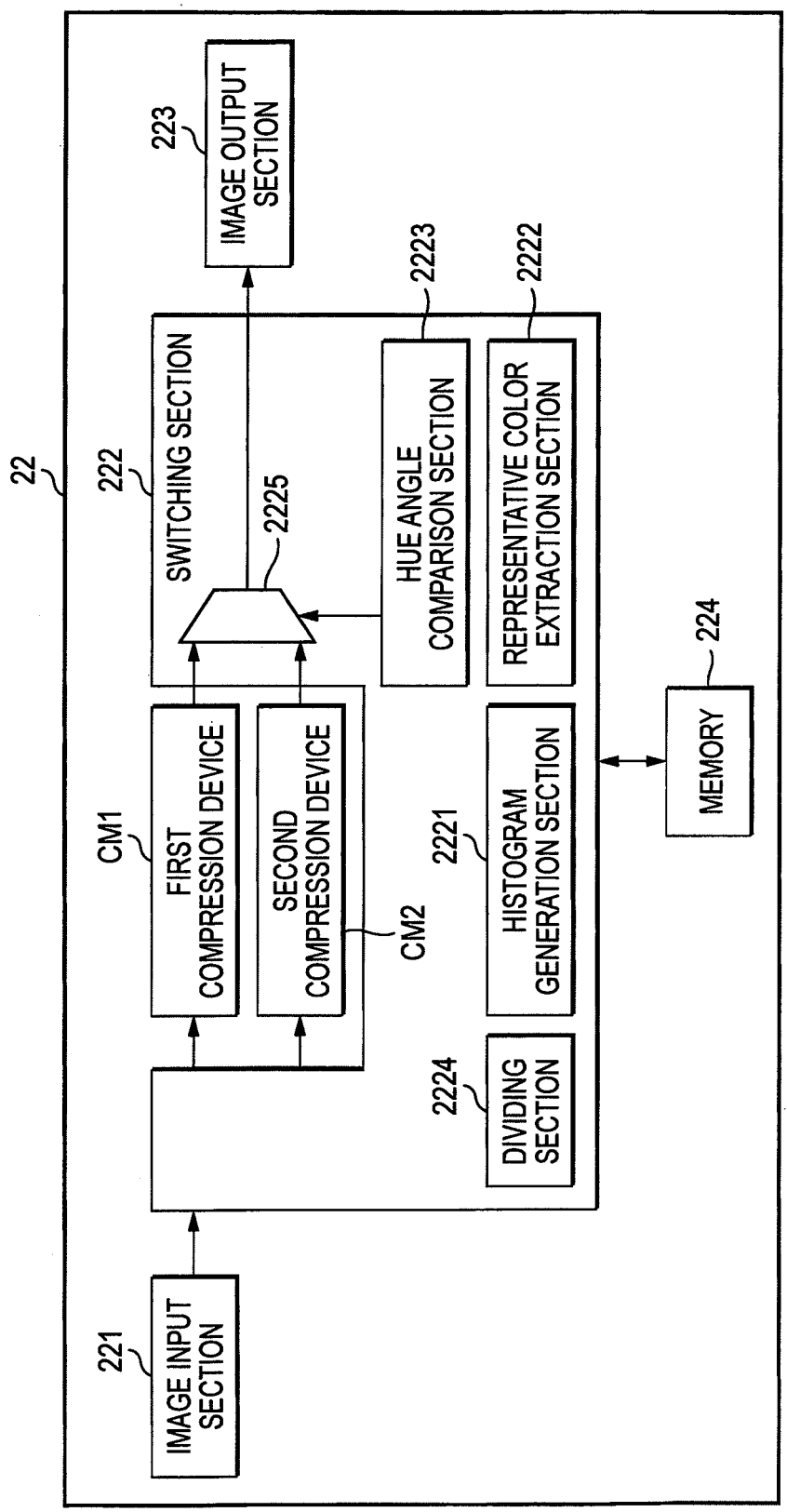
FIG. 9 is a block diagram showing a third configuration example of the compression switching section.

FIG. 9 is a block diagram showing a third configuration example of the compression switching section. The compression switching section 22 includes an image input section 221, a switching section 222, a memory 224, a first compression device CM1, a second compression device CM2, and an image output section 223. This exemplary embodiment will be described based on an example in which two compression devices of the first compression device CM1 and the second compression device CM2 are provided. However, this exemplary embodiment may be provided with three or more compression devices.

Expanded image data are input from the expansion section 21 shown in FIG. 1 into the image input section 221. Plurality compression devices, which include the first compression device CM1 and the second compression device CM2, carry out compression by compression methods different from each other. In this exemplary embodiment, it is assumed that the first compression device CM1 carries out compression by a lossy compression method and that the second compression device CM2 carries out compression by a lossless compression method. Examples of the lossy compression method include JPEG, and, examples of the lossless compression method include MMR and JBIG2. The compression methods are not limited to JPEG, MMR or JBIG2 which are listed above, but other compression methods are available.

The switching section 222 switches among the plural compression devices including the first compression device CM1 and the second compression device CM2. The switching section 222 includes a dividing section 2224, a histogram generation section 2221, a representative color extraction section 2222, a hue angle comparison section 2223 and a selection section 2225.

The dividing section 2224 divides the image data of one page, which is input from the image input section 221, in units of predetermined areas (blocks). Examples of the unit of the block include a band obtained by dividing one page at intervals of predetermined widths, a rectangular area obtained by dividing one page at intervals of predetermined lengths and intervals of predetermined widths. The dividing section 2224 reads the image data, which are input from the image input section 221 and which are temporarily stored in the memory, with dividing the image data into blocks, and transmits it to the histogram generation section 2221.

The histogram generation section 2221 carries out a process of counting the frequencies of appearance (histogram) of pixel values, for the block image data read by the dividing section 2224. The histograms is generated in a similar manner to the first configuration example of the compression switching section described above.

The representative color extraction section 2222 carries out a process of extracting specific colors (representative colors) from peaks of the block histograms generated by the histogram generation section 2221. The detailed process is similar to that in the first configuration example of the compression switching section described above.

The hue angle comparison section 2223 compares, with threshold values, an angle formed between hue angles of two block representative colors of each of combinations which are obtained by selecting any two of the block representative colors extracted by the representative color extraction section 2222. The hue angle comparison section 2223 transmits, to the selection section 2225, an instruction to select one of the plural compression devices including the first compression device CM1 and the second compression device CM2, in accordance with the result of the comparison of the angles formed between the hue angles.

The selection device 2225 selects one of the outputs (compressed image data) from the plural compression devices including the first compression device CM1 and the second compression device CM2, based on the instruction transmitted from the hue angle comparison section 2223, and transmits the selected output to the image output section 223.

The image output section 223 changes the image data, which are compressed by the selected one of the plural compression devices including the first compression device CM1 and the second compression device CM2, into a certain data format, and outputs it.

In the third configuration example of the compression switching section, a histogram is generated in block units from image data of one page, and the compression device is switched. Layered-structure data of a compressed image can be obtained in block units.

<5. Image Processing Program>

Next, description will given on an image processing program according to this exemplary embodiment. The image processing program according to this exemplary embodiment includes steps executed by a computer. The computer includes a calculation section for executing the image processing program according to this exemplary embodiment, a memory section for storing programs and various types of data, and input/output sections. The computer may be an electronic calculator such as a personal computer, or may be incorporated into an electronic device capable of handling information, such as a video recording/reproducing apparatus or a portable terminal. Also, the information processing program according to this exemplary embodiment may be recorded in a recording medium (an example of a computer-readable medium) such as a CD-ROM or DVD-ROM. Alternatively, the information program according to this exemplary embodiment may be distributed through a network.

[Hardware Configuration]

Figure 10:
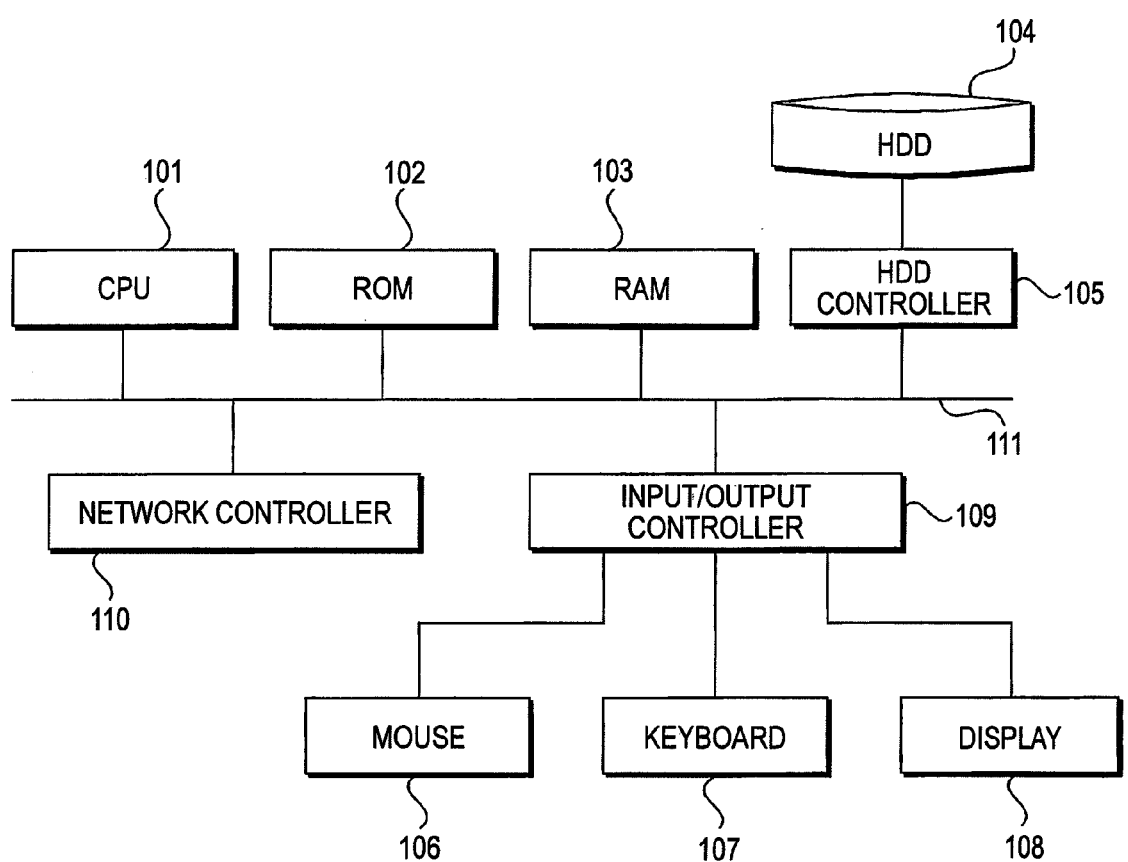
FIG. 10 is block diagram showing the hardware configuration of a computer that executes an image processing program.

FIG. 10 is a block diagram showing a hardware configuration of a computer that executes the image processing program. The hardware configuration of the computer is such that a CPU (Central Processing Unit) 1, a ROM (Read Only Memory) 2, a RAM (Random Access Memory) 3, an HDD (Hard Disk Drive) 4, an HDD controller 5, a mouse 6, a keyboard 7, a display 8, an input/output controller 9 and a network controller 10 are connected to each other via a bus.

The image processing program according to this exemplary embodiment described later is stored in the HDD 4 of the above hardware configuration, is read into the RAM 3 when executing the program, and is executed by the CPU 1.

[Flowchart: Program Corresponding to Compression Switching Section]

Figure 11:
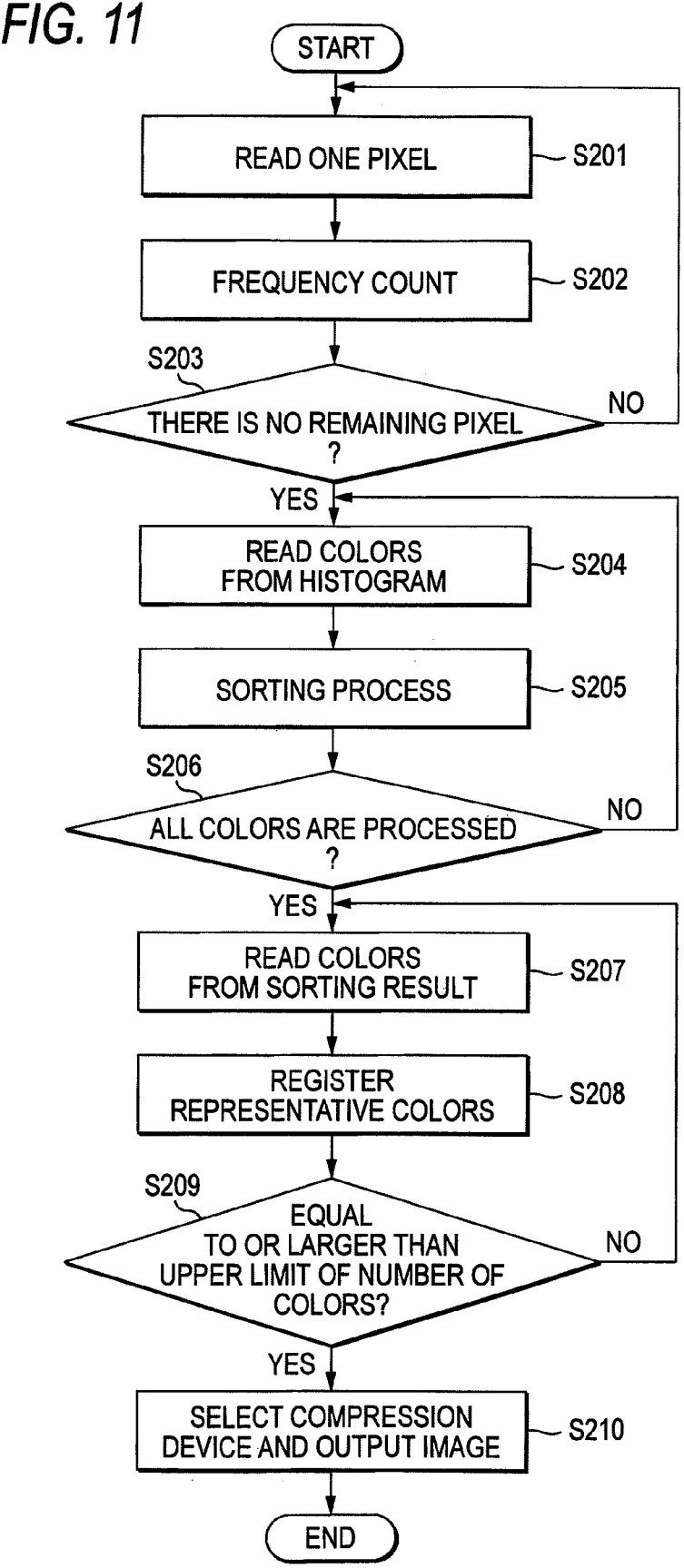
FIG. 11 is a flowchart for explaining a flow of a program corresponding to the compression switching section.

FIG. 11 is a flowchart for explaining a flow of the program corresponding to the compression switching section.

First, a pixel value of one pixel of an input image is read (step S201), and a frequency count is performed (step S202). These processes are carried out for all of the pixels of the input image (step S203).

Next, a color having a frequency is read from the histogram (step S204), and colors already read are sorted in order of high frequency (step S205). The reading process and the sorting process of colors having frequencies are repeated for all of the colors having frequencies (step S206).

Next, based on the result of the sorting process, the colors are read in order of high frequency (step S207) and are registered as representative colors (step S208). Next, it is determined as to whether or not the number of registered representative colors is equal to or more than an upper limit of the number of colors (step S209). If the number of registered representative colors is less than the upper limit of the number of colors, reading of the colors (step S207) and registration of the representative colors (step S208) are repeated.

After that, a compression device is selected in accordance with the angles formed between the hue angles of the registered representative colors, and the image data are output (step S210). Among them, calculation of the angles formed between the hue angles of the representative colors and selection of the compression device are carried out along the flowchart of FIG. 5.

Figure 12:
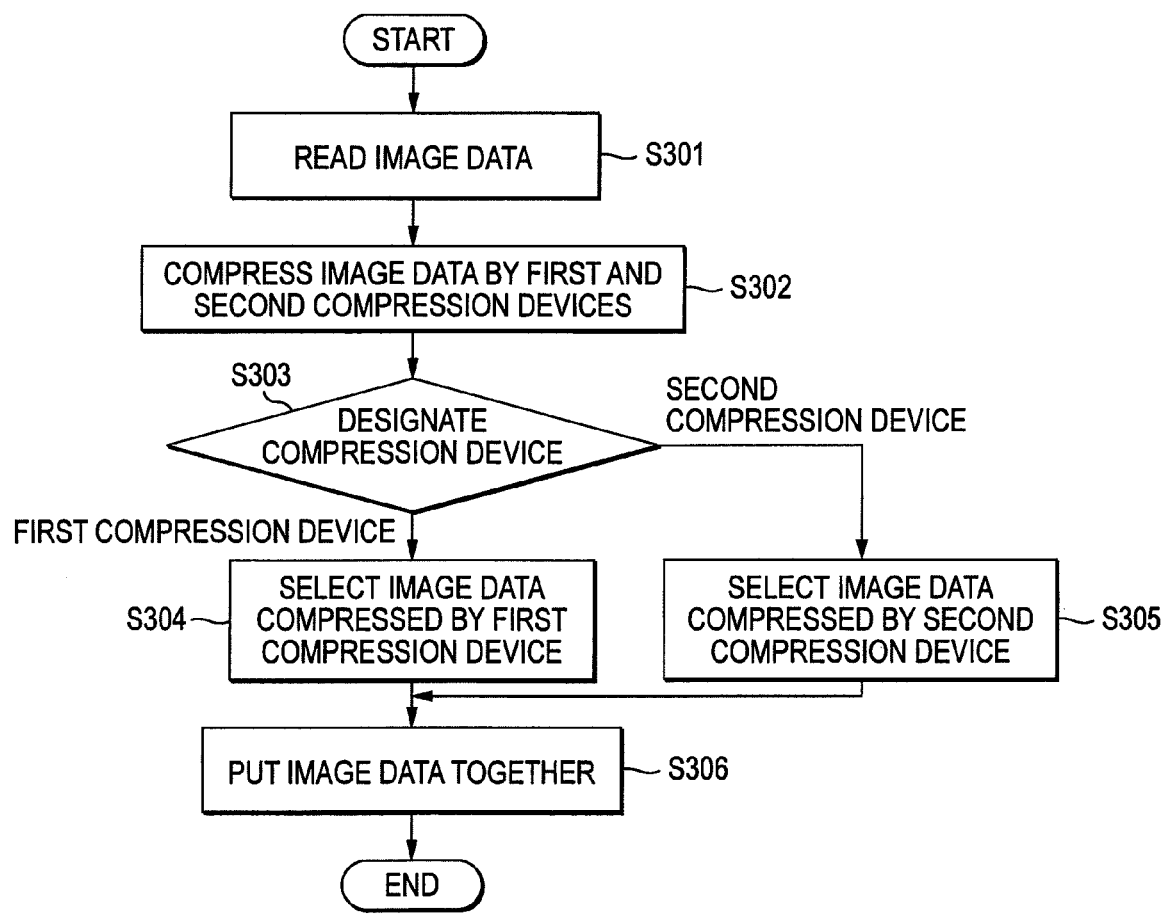
FIG. 12 is a first example of a flowchart for explaining a flow of a program corresponding to selection of compression devices and image output.

FIG. 12 is a first example of a flowchart for explaining a flow of the program corresponding to selection of the compression device and image output. The flowchart shown in FIG. 12 corresponds to processes which are carried out by the compression switching section 22 shown in FIGS. 2 and 9. First, image data is read (step S301). Specifically, the compression switching section 22 shown in FIG. 2 reads image data of one page. Then, after the image data of one page is stored in the memory, the compression switching section 22 shown in FIG. 9 reads image data in block units from the memory.

Next, the read image data is input into the first compression device CM1 and the second compression device CM2, and the image data are compressed by the respective compression methods (step S302). Then, it is determined which compression device is to be designated (Step S303). The compression device is designated along the flowchart shown in FIG. 5. As a result, if the first compression device CM1 is designated, the image data compressed by the first compression device CM1 is selected (step S304); and if the second compression device CM2 is designated, the image data compressed by the second compression device CM2 is selected (step S305). After that, the compressed image data is changed into the certain data format to form one file, and is output (Step S306).

Figure 13:
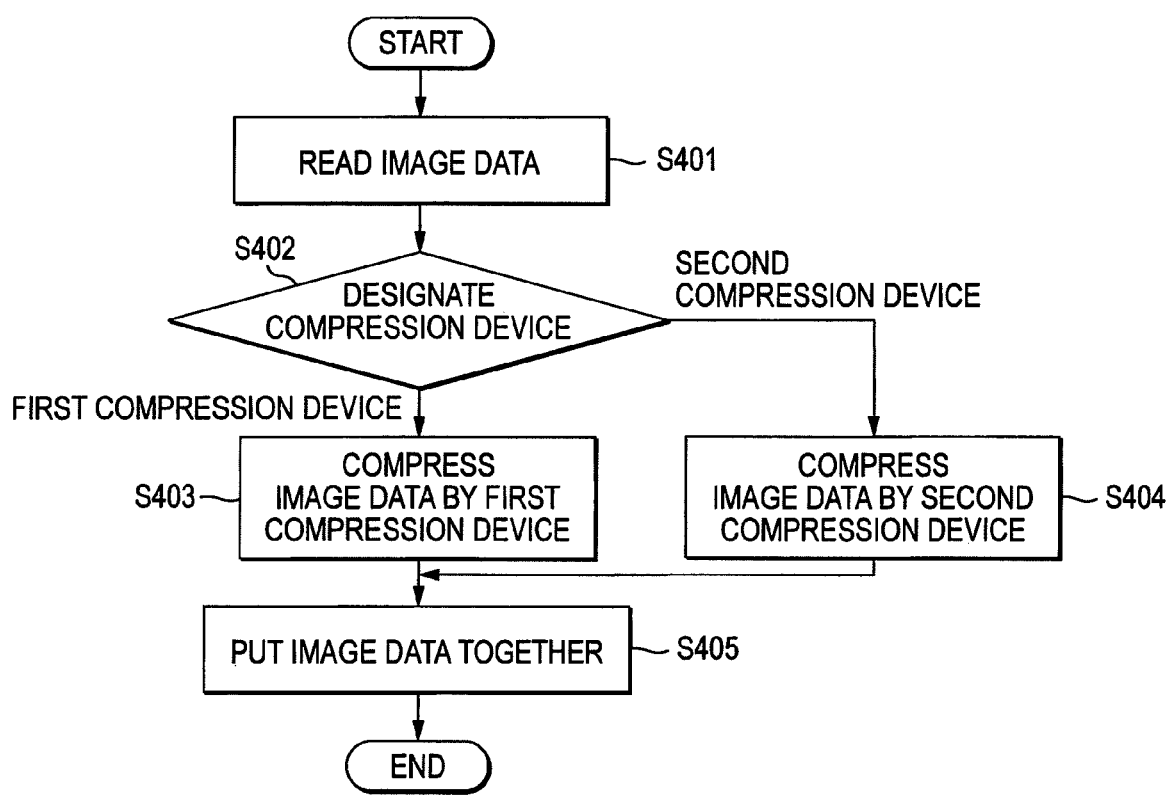
FIG. 13 is a second example of a flowchart for explaining a flow of a program corresponding to selection of compression devices and image output.

FIG. 13 is a second example of a flowchart for explaining a flow of the program corresponding to selection of the compression devices and image output. The flowchart shown in FIG. 13 corresponds to processes which are carried out by the compression switching section 22 shown in FIG. 8. First, the image data is read (step S401). Specifically, the image data of one page is read or the image data is read in block units.

Next, it is determined which compression device is to be designated (step S402). The compression device is designated along the flowchart shown in FIG. 5. As a result, if the first compression device CM1 is designated, the image data is input into the first compression device CM1 and is compressed therein (step S403). If the second compression device CM2 is designated, the image data is input into the second compression device CM2 and is compressed therein (step S404). After that, the compressed image data is changed into the certain data format to form one file, and is output (step S405).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a plurality of compression units that compress image information by different compression methods; and
a switching unit that extracts plural pieces of color information from pieces of color information which constitute the image information in a color space expressing the image information, and selects one of the plurality of compression units in accordance with angles formed between hue angles of the plural pieces of extracted color information.

2. An image processing apparatus comprising:
a plurality of compression units that compress image information by different compression methods; and
a switching unit that extracts plural pieces of color information from pieces of color information which constitute the image information in a color space expressing the image information, and selects one of the plurality of compression units in accordance with hue angles of the plural pieces of extracted color information, wherein the plurality of compression units includes
a first compression unit that uses a lossy compression method, and
a second compression unit that uses a lossless compression method, and
if at least one of angles which are formed between the hue angles of the plural pieces of extracted color information is within a threshold value range which is set in advance, the switching unit selects the first compression unit.

3. The image processing apparatus according to claim 1, wherein the switching unit selects one of the plurality of compression units for each of segment areas which are obtained by dividing one page of the image information is divided.

4. An image processing apparatus comprising:
a plurality of compression units that compress image information by different compression methods; and
a switching unit that extracts plural pieces of color information from pieces of color information which constitute the image information in a color space expressing the image information, and selects one of the plurality of compression units in accordance with hue angles of the plural pieces of extracted color information,
wherein the switching unit counts frequencies of color information in each of segment areas which are obtained by dividing the color space expressing the image information, and extracts the plural pieces of color information from the pieces of color information, which constitute the image information in the color space, based on the counted frequencies.

5. The image processing apparatus according to claim 2, wherein the switching unit uses threshold values, which are different from each other, for respective color gamuts in the color space of the image information.

6. The image processing apparatus according to claim 1, wherein the switching unit selects the one of the plurality of compression units by selecting one of a plurality of compressed images, which are compressed by the plurality of compression unit, in accordance with the hue angles of the plural pieces of extracted color information.

7. The image processing apparatus according to claim 1, wherein the switching unit inputs the image information into the selected one of the plurality of compression units.

8. An image processing method comprising:
extracting plural pieces of color information from pieces of color information which constitute image information in a color space expressing the image information, and
selecting one of a plurality of compression units, which compress image information by different compression methods, in accordance with angles formed between hue angles of the plural pieces of extracted color information.

9. A non-transitory computer-readable medium storing a program that causes a computer to execute image processing, the image processing comprising:
extracting plural pieces of color information from pieces of color information which constitute image information in a color space expressing the image information, and
selecting one of a plurality of compression units, which compress image information by different compression methods, in accordance with angles formed between hue angles of the plural pieces of extracted color information.

* * * * *